Figure 1:
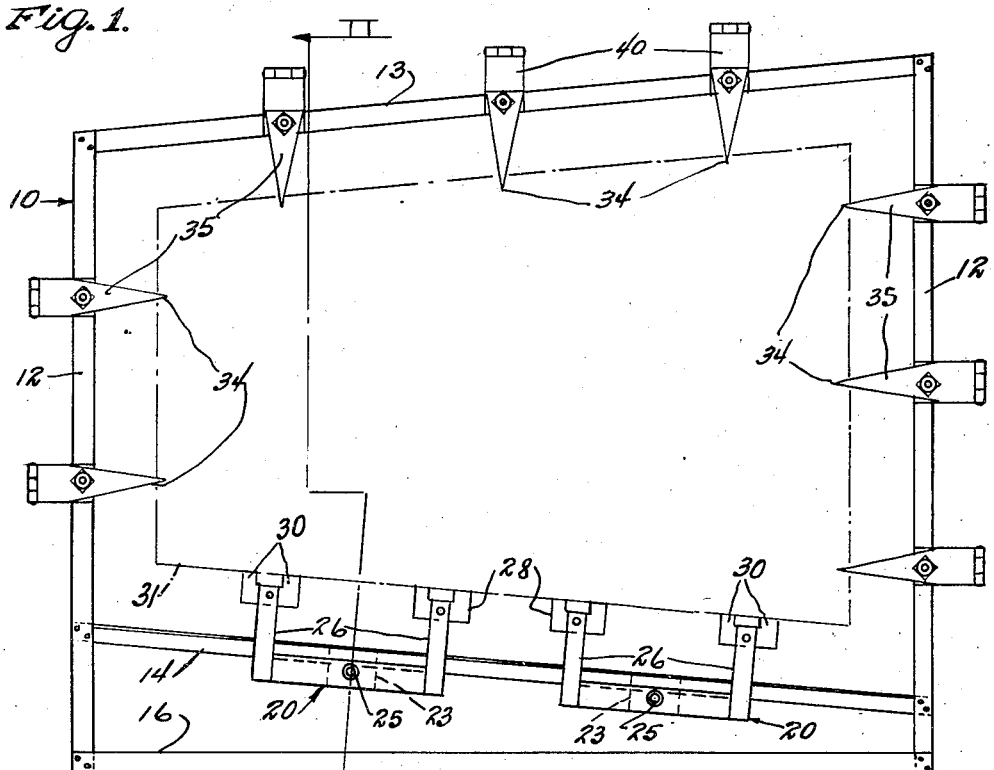

June 26, 1945.  L. V. BLACK  2,379,213
SKELETON FRAME FOR SUPPORTING GLASS
Filed March 2, 1944

Inventor
LLOYD V. BLACK
By Olen E. Bee
Attorney

Patented June 26, 1945

2,379,213

UNITED STATES PATENT OFFICE 2,379,213

SKELETON FRAME FOR SUPPORTING GLASS

Lloyd V. Black, Tarentum, Pa., assignor to Pittsburgh Plate Glass Company, Allegheny County, Pa., a corporation of Pennsylvania Application March 2, 1944, Serial No. 524,698

7 Claims. (Cl. 49—45)

This invention relates to supporting frames for glass plates or sheets, and it has particular relation to frames adapted to support either flat plates or curved plates preparatory to, or during, heat treatment.

One object of the invention is to provide an improved frame structure adapted to support bent glass in a leaning position wherein elements surrounding the glass receive the weight thereof uniformly distributed.

Another object of the invention is to provide a supporting frame so coordinated with the character of the glass to be supported, with reference to reaction to the effects of heat, that the relationship between the glass and supporting frame remains substantially the same regardless of changes in temperatures over wide ranges.

The invention described and claimed herein is particularly adapted to be employed in supporting glass which is shaped as a result of compound bending into spheroidal or like form to conform to the contour of airplane surfaces, or to other compound curvatures employed in automobile streamlining, or the like. Such glass is subjected to heat treatment for annealing, or for other purposes, and in bending the glass it is difficult to produce specimens of exact duplication. Therefore, problems arise with reference to supporting the glass so that the supporting frames exactly fit the glass contour and remain so fitted during temperature changes. If such fitting is not exact undesirable distortion of the glass will result from the heat treatment.

A form structure designed according to this invention is provided with supporting elements which can be quickly adjusted to conform exactly to the shape of the glass. Although the supporting elements are relatively small individually, they contact the glass at various points about its perimeter and provide adequate support therefor. Each supporting element can be individually adjusted.

Another feature of the invention involves a frame structure composed of alloy, which has the same coefficient of expansion as the glass. A particularly selected alloy, such as chrome-nickel-iron alloy, or chrome-iron alloy has been found to be satisfactory for building a frame having the same coefficient of expansion as the glass.

Figure 2:
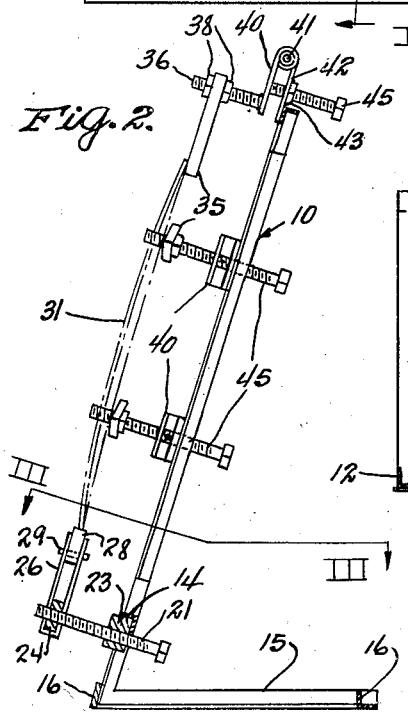
Figure 3:
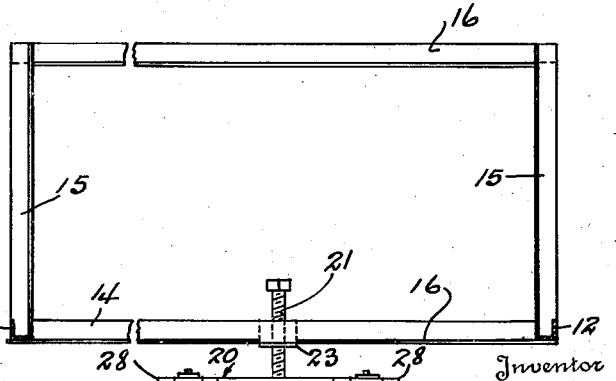

In the drawing:

Fig. 1 is a front view, substantially in elevation, of a frame structure, but taken at an angle to the horizontal and looking perpendicularly to the plane of the frame structure; Fig. 2 is a vertical section taken substantially along the line II—II of Fig. 1; and Fig. 3 is an approximate horizontal section taken substantially along the line III—III of Fig. 2.

In practicing the invention, there is provided a substantially upright frame 10 which leans at an angle to the vertical and in which opposite upright end members 12 are joined with lateral upper and lower members 13 and 14, which are rigidly secured thereto by means of welding, or other fastening means, to form a polygonal skeleton frame structure. The upright members 12 extend downwardly below the lower frame member 14 and are bent rearwardly to provide extensions 15, which are joined forwardly and rearwardly by horizontal frame members 16, welded or otherwise rigidly secured thereto to provide a base frame which is adapted to rest upon a floor or conveyor to insure proper support of the frame structure in the position shown in Fig. 2.

Lower teetering supports 20 are pivotally mounted upon rods 21 that are screw-threaded through blocks 23 rigidly mounted by welding upon the lower frame member 14. Each support 20 comprises a bar 24 pivoted centrally, as indicated at 25, upon the outer end of the rod 21.

U-shaped straps 26 are welded, brazed, or otherwise rigidly secured to opposite ends of each bar 24 with the legs of the U-shaped straps opening upwardly to receive blocks 28 pivotally upon pins 29 extending therethrough and through the straps. Each block includes upwardly facing projections 30 having appreciable area so as to be adapted to support the lower edge of a glass sheet or plate 31. In view of the pivotal mounting of the supports 20 including the blocks 28 the flexibility of the supports in adjusting themselves to irregularities in the glass edge, and uniformly distributing the weight thereof, will be apparent.

The glass plate 31, when carried along its lower edge upon the primary supports 20, leans at an angle to the vertical against small pointed end portions 34 of plates or blocks 35. The end portion of each block 35 opposite its pointed portion is rigidly and adjustably mounted upon a screw-threaded pin 36 which has nuts 38 thereon adjustably screw-threaded against opposite sides of the block.

Each block-supporting pin 36 has its inner end welded to the outer side of a hinge plate 40, which has its outer end hinged, as indicated at 41, to a stationary plate 42. Each plate 42 is welded or otherwise rigidly secured to the frame structure 10 around its border portions. A lug 43 is welded to the outer side of each hinge plate 42 to receive in screw-threaded relation a bolt 45, the inner end of which abuts the face of the outer hinge plate 40. By manipulating the bolts 45 the pointed ends 34 of the blocks can be adjusted toward and away from the plane of the frame and each block in this way can be adjusted separately. Also each block 35 can be separately adjusted pivotally upon its pin 36, as well as lengthwise of the latter by manipulating the nuts 38. The glass plate 31, while being supported along its lower edge, therefore leans against the pointed end portions of the blocks which are so adjusted as to receive equally the weight of the glass leaning thereagainst. After the various elements have been so adjusted as to conform exactly to the contour of the glass sheet the entire assembly is subjected to heat treatment of annealing, or otherwise, for example, according to the treatment described in U. S. Patent No. 2,032,008, issued February 25, 1936. Since the metallic supporting elements or members 10, 20, 35, etc. are composed of alloy having the same coefficient of expansion of the glass carried thereby, the expansion resulting from the heat will be the same in the glass as in the supports. Therefore, the glass will remain equally supported around its edges in such manner that the alloy frame and glass will not be subjected to relative expansions which otherwise would occur in the event the supports were composed of ordinary metal.

Although only one form of the invention has been shown and described in detail, it will be apparent to those skilled in the art that the invention is not so limited but that various changes can be made therein without departing from the spirit of the invention or from the scope of the appended claims.

I claim:

1. A glass supporting apparatus comprising a polygonal frame having spaced upright frame members and cross frame members laterally connecting the upper and lower portions of the upright frame members, a bar having its intermediate portion pivoted upon the lower cross frame member and also having a plurality of pivotally mounted upwardly facing elements thereon for receiving the lower edge of a glass plate at spaced points of support, and marginal supports having outer end portions hinged to the side and upper portions of the polygonal frame and having inwardly projecting extensions movable toward and away from the plane of the polygonal frame in response to hinging movement of said marginal supports for receiving marginal portions of the glass plate leaning against the inner end portions of said extensions.

2. A glass supporting apparatus comprising a polygonal frame having spaced upright frame members and cross frame members laterally connecting the upper and lower portions of the upright frame members, a bar having its intermediate portion pivoted upon the lower cross frame member and also having a plurality of pivotally mounted upwardly facing elements thereon for receiving the lower edge of a glass plate at spaced points of support, marginal supports having outer end portions hinged to the side and upper portions of the polygonal frame and having inwardly projecting extensions movable toward and away from the plane of the polygonal frame in response to hinging movement of said marginal supports for receiving marginal portions of the glass plate leaning against the inner end portions of said extensions, and means associated with the hinged marginal supports for selectively limiting hinging movement thereof.

3. A glass supporting apparatus comprising a polygonal frame having spaced upright frame members and cross frame members laterally connecting the upper and lower portions of the upright frame members, a series of upwardly facing supporting elements flexibly carried upon the lower frame member for receiving the lower edge of a glass plate at spaced points of support thereon, marginal supports having outer end portions hinged to the side and upper portions of the polygonal frame and having inwardly projecting pointed ends movable toward and away from the plane of the polygonal frame in response to hinging movement of said marginal supports and adapted to receive marginal portions of the glass plate leaning against the inner pointed ends of said extensions, stop means adjustably engageable with the hinged extension for setting the glass receiving pointed ends to conform to the contour of the glass to be leaned thereagainst.

4. A glass supporting apparatus comprising a polygonal frame having spaced upright frame members and cross frame members laterally connecting the upper and lower portions of the upright frame members, a series of upwardly facing supporting elements flexibly carried upon the lower frame member for receiving the lower edge of a glass plate at spaced points of support thereon, marginal supports including outer plates hinged along the side and upper portions of the polygonal frame, said supports also including inwardly extending arms overlying the plane of the frame and pivotally adjustable on said plates about axes disposed approximately at right angles to the hinging axes of said plates.

5. A glass supporting apparatus comprising a polygonal frame having spaced upright frame members and cross frame members laterally connecting the upper and lower portions of the upright frame members, a series of upwardly facing supporting elements flexibly carried upon the lower frame member for receiving the lower edge of a glass plate at spaced points of support thereon, marginal supports including outer plates hinged along the side and upper portions of the polygonal frame, each plate having a rod rigidly mounted thereon at approximately right angles to the plate, an arm mounted transversely upon each rod, means associated with the rod and arm for adjusting the latter pivotally and lengthwise with respect to the rod.

6. A glass supporting apparatus comprising a polygonal frame having spaced upright frame members and cross frame members laterally connected to the upper and lower portions of the upright frame members, a series of upwardly facing supporting elements flexibly carried upon the lower frame member for receiving the lower edge of a glass plate at spaced points of support thereon, marginal supports having outer end portions hinged to the sides and upper portion of the polygonal frame and having inwardly projecting extensions movable toward and away from the plane of the polygonal frame in response to hinging movement of said marginal supports to conform to and receive marginal portions of the glass plate leaning against the inner end portions of said extensions, and means associated with the hinged marginal supports for selectively limiting hinging movement thereof, said polygonal frame together with the lower supporting elements and marginal supports being composed of material having approximately the same coefficient of expansion as glass.

7. A glass supporting apparatus comprising a metallic polygonal frame having spaced upright frame members and cross frame members laterally connected to the upper and lower portions of the upright frame members, a series of upwardly facing supporting elements flexibly carried upon the lower frame member for receiving the lower edge of a glass plate at spaced points of support thereon, marginal supports of metal having outer end portions hinged to the sides and upper portion of the polygonal frame and having inwardly projecting extensions movable toward and away from the plane of the polygonal frame in response to hinging movement of said marginal supports to conform to and receive marginal portions of the glass plate leaning against the inner end portions of said extensions, and means associated with the hinged marginal supports for selectively limiting hinging movement thereof, said polygonal frame together with the lower supporting elements and marginal supports being composed of metal having approximately the same coefficient of expansion as glass.

LLOYD V. BLACK.